United States Patent

[11] 3,584,711

| | | |
|---|---|---|
| [72] | Inventor | Hugh G. Margetts<br>Leamington Spa, England |
| [21] | Appl. No. | 759,359 |
| [22] | Filed | Sept. 12, 1968 |
| [45] | Patented | June 15, 1971 |
| [73] | Assignee | Girling Limited<br>Tyseley, Birmingham, England |

[54] ADJUSTABLE DISC BRAKE PUSH ROD
8 Claims, 6 Drawing Figs.

[52] U.S. Cl............................................. 188/196,
188/72.6
[51] Int. Cl............................................. F16d 65/46,
F16d 55/18
[50] Field of Search.......................................... 188/72.6,
72.9, 79.5 GE, 50, 196 R; 74/579, 287

[56] References Cited
UNITED STATES PATENTS
433,412   7/1890   Lawrence.................... 188/196 (R) X
2,154,074   4/1939   Rasmussen et al............ 188/79.5 (SC)

*Primary Examiner*—Duane A. Reger
*Attorney*—Scrivener, Parker, Scrivener and Clarke ABSTRACT: A hydraulic actuator for a vehicle brake system is provided with an automatic adjuster and with an auxiliary mechanical actuator which acts through a push rod forming part of the adjuster. The automatic adjuster operates between a hydraulic piston and either a second reaction piston opposed thereto or a cylinder body. The mechanical actuator comprises a cam journaled in said reaction piston or said cylinder body. The reaction piston or cylinder body acts as a guide member for the push rod and is hydraulically sealed thereto. The push rod must be prevented from turning to permit the automatic adjuster to operate and for this purpose the push rod is made noncircular, e.g., oval, in cross section, as is the complementary opening in the guide member.

ADJUSTABLE DISC BRAKE PUSH ROD

The present invention is concerned with a push rod which is to be sealed to a guide member in which it is slidable and is to be nonrotatable relatively to such member. The invention is particularly applicable to push rods for the auxiliary mechanical actuation of a vehicle brake provided with a hydraulic actuator and with an automatic adjuster, for example of the kind described in U.S. Pats. Nos. 3,442,357, 3,488,687 and 3,491,859 to G.P.R. Farr and dated May 6, 1969, Jan. 6, 1970 and Jan. 27, 1970, respectively.

The above-mentioned patents describe opposed piston-type hydraulic actuators having an automatic adjuster operative between one piston and a mechanical actuator in the second piston. The mechanical actuator acts upon a push rod of the automatic adjuster, the push rod being sealingly guided in a bore in the second piston. In some of the embodiments described in the above-mentioned patents the push rod must be prevented from turning relatively to the second piston so that the automatic adjuster can work. The above-mentioned patents disclose various means for preventing such relative rotation all of which involve additional components which have to be fitted to the push rod or to the second piston or to both.

According to the present invention, a push rod of noncircular cross section is slidably guided in an opening of complementary cross section in guide member to which the push rod is sealed by a resilient sealing member.

Preferably, the sealing member is received in a continuous recess in said guide member and has a noncircular inner periphery by which it slidably engages the push rod. Alternatively however, the resilient sealing member can be received in a recess in the push rod in which case its outer periphery is noncircular and conforms to the cross section of the opening in said guide member. In either case the recess may be of uniform radial depth in which case the other periphery outer or inner as the case may be) of the sealing member is also noncircular. Thus, the sealing member can be of uniform section and may be made circular the flexibility of the sealing member allowing it to be deformed to the noncircular shape of the push rod. Alternatively, said other periphery of the sealing member can be circular in which case the groove is of circumferentially nonuniform radial depth.

Various cross sections are appropriate for the push rod but it preferably has no sharp corners. Suitable cross sections are oblong, square or rectangular with rounded corners, oval and elliptical.

The invention is further described, by way of example, with reference to the accompanying drawings, in which.

Figure 1:
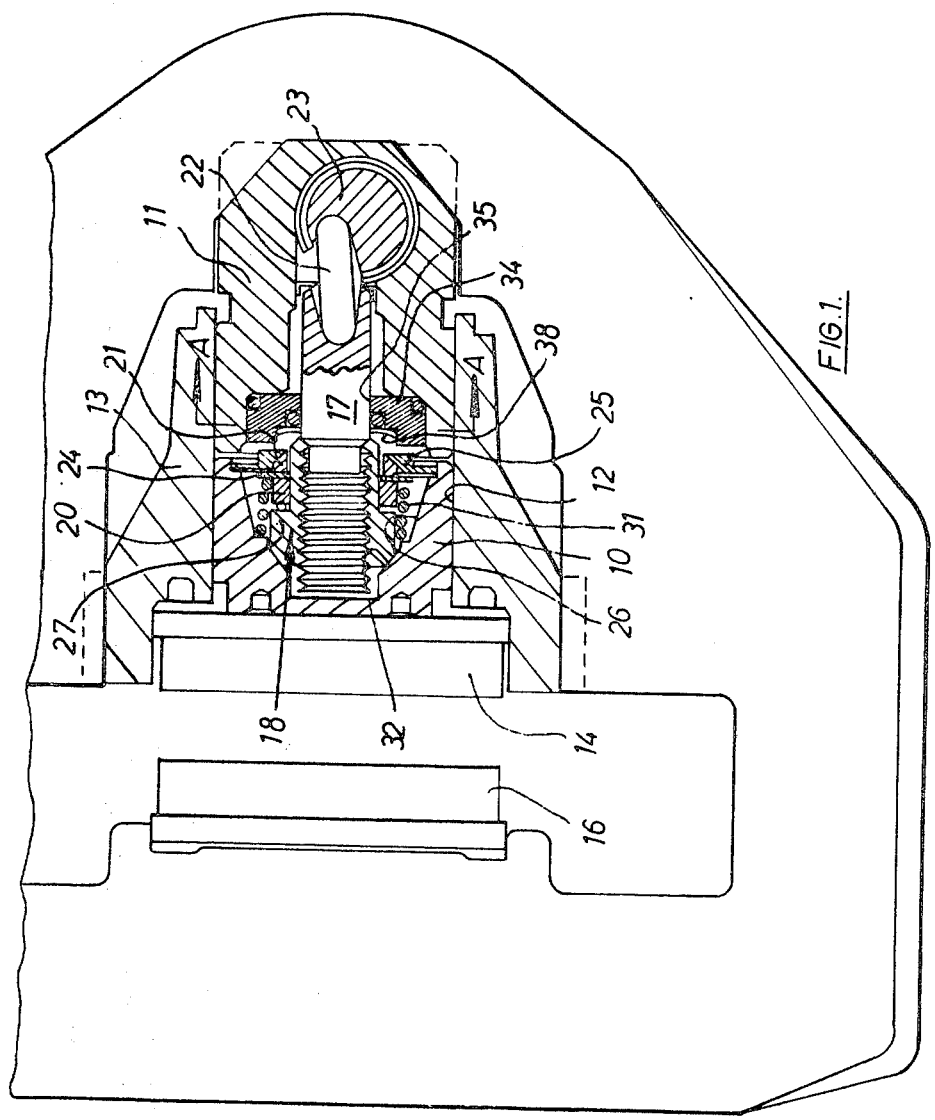
FIG. 1 is a sectional plan view of an opposed piston-type hydraulic actuator for a spot-type disc brake and having an auxiliary mechanical actuator acting upon a push rod slidably guided in a piston in accordance with the present invention.

Referring now to FIG. 1 a hydraulic actuator comprises a pair of opposed pistons 10 and 11 slidable in a common bore 12 extending through a fixed body member 13. The piston 10 bears against a directly operated pad 14 while the piston 11 bears against a yoke 15 carrying an indirectly operated pad 16. An inlet (not shown) is provided to the space between the pistons 10 and 11. The movement of the pistons 10 and 11 towards one another is limited by an automatic adjuster comprising a rod 17, a nut 18 having a screw thread connection with the rod 17 and a friction brake comprising a cam ring 20 and an abutment ring 21. Rightward motion of the rod 17 is limited by a dolly 22 arranged between the rod 17 and a cam 23 journaled in the piston 11 which bears against the yoke. Anticlockwise motion of the cam 23 is employed in purely mechanical operation of the disc brake, e.g., by handbrake, and clockwise movement of the cam 23 is limited by a stop (not shown). The screw thread connection and the friction brake 20, 21 are contained within a blind bore 26 within the piston 10. The abutment ring 21 is spherically seated on an annulus 25 which is a force-fit in the end of the blind bore 26.

The friction brake 20, 21 includes a metal washer 24 which, for the purposes of understanding the operation of the adjuster may be regarded as part of the cam ring 20, and which bears against the abutment ring 21. The abutment ring 21 is of a material, such as polytetrafluoroethylene, having a suitable coefficient of friction. The cam ring 20 forming part of the friction brake cooperates with a flange 27 on the nut 18. Three balls (only one of which is shown) are arranged between the cam ring 20 and the flange 27. These balls are received in cooperating cam recesses in the flange 27 and the cam ring 20. Thus, when the nut 18 is moved to the right relative to the cam ring 20, relative rotation between these parts is automatically caused by the camming action of the balls 28. A torsion spring 31 acts between the flange 27 and the cam ring 20 and turns these relative to one another so that they are urged apart by the camming action of the balls 28 until the end of the nut 18 abuts a shoulder 32 towards the base of the blind bore 26.

Figures 2, 3:
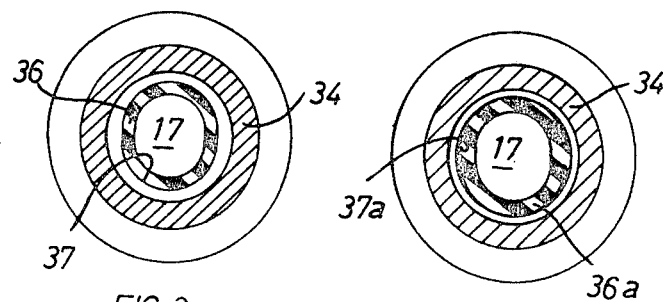
FIG 2 is a section on the line A–A of FIG. 1.
FIG 3 is a similar section showing an alternative shape of sealing member.

The piston 10 is prevented from turning by the directly operate pad which it abuts and the piston 11 is prevented from turning by the yoke. The rod 17 is made of oblong cross section and is prevented from turning in the piston 11 by a bush 34 force-fitted in a counterbore in the piston 11. The rod 17 is slidably guided in the opening 35 through the bush, such opening being of oblong cross section complementary to the cross section of the rod 17 as shown in FIG. 2. The piston 11 with the bush 34 thereby constitutes a guide member for the rod 17. A sealing ring 36 seals the rod 17 to the piston 11 and suitable seals (not shown) seal the pistons 10 and 11 to the bore 12. The sealing ring 36 is retained in a recess 37 in the bush 34 by a washer 38. The recess 37 is of uniform radial depth and the sealing ring 36 is of uniform cross section so that it can be made as a conventional sealing ring. The recess 37 can be conveniently cold-formed in the bush 34 since great accuracy is not required and the smooth surface finish thereby produced helps to provide a good oil seal.

During operation of the actuator by applying hydraulic fluid pressure to the space 16, the pistons 10 and 11 are urged apart to apply the disc brake and the rod 17 is urged to the right against the axial force of the torsion spring 31 against the dolly 22. This is because the fluid pressure finds its way through the axial clearance in the screw thread connection 19 to the lefthand end of the rod 17. The axial clearance of the screw thread connection 19 is such that during normal operation of the disc brake this clearance is not completely taken up by the relative movement between the piston 10 and the rod 17 nor during "knock back" of the piston 10 such as may occur due to disc deflection, for example on cornering. The axial thread clearance is of the order of twenty-thousandths of an inch.

When adjustment is required, the thread clearance is completely taken up and the nut 18 is moved to the right by the spindle 17 relative to the piston 10. This moves the flange 27 towards the cam ring 20 causing relative rotation in one direction between these parts. This relative rotation is such that the nut 18 turns anticlockwise as viewed in FIG 1 relative to the cam ring 20. With the relative rotation in this sense the frictional torque arising at the screw thread connection is less than the frictional torque which the friction brake 20, 21 is capable of sustaining. The cam ring 20 is thereby prevented from turning by the friction clutch whereas the nut 18 is turned on the rod 17 to effect the required adjustment. When the hydraulic pressure is reduced the torsion spring 31 causes relative rotation between the flange 27 and the cam ring 20 in the opposite direction until the nut again abuts the shoulder 32. However, because the relative rotation is now in the opposite sense, the frictional torque capable of being developed at the screw thread connection is now greater than the frictional torque which the friction brake 20, 21 is capable of sustaining. The cam ring 20 therefore turns anticlockwise relative to the flange 27 as viewed in FIG. 2 and the nut 18 is not turned back.

When the handbrake is applied, he cam 23 is turned anticlockwise and acts on the rod 17 through the dolly 22. The handbrake force is applied through the screw thread connection to the nut 18 which is thereby pressed against the abutment shoulder 32 in the piston 10 whereby the pistons 10 and 11 are urged relatively apart to apply the disc brake. There is no torque tending to turn the nut 18 on the rod 17 during application of the handbrake and indeed such turning is resisted by the friction which arises at the shoulder 32.

The operation of the automatic adjuster of FIGS. 1 and 2 is described more fully in the copending above-mentioned U.S. Pat. No. 3,491,859.

FIG. 3 shows a slight modification to the bush 34 in that the recess 37a receiving the resilient sealing ring 36a has a circular outer periphery as does the sealing ring itself. The sealing ring 36a therefore has to be specially manufactured for the purpose but the recess 37a is simpler to form.

Figure 4:
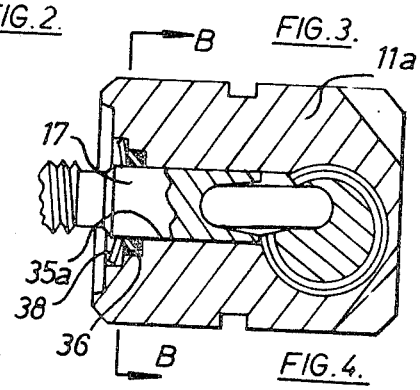
FIG. 4 is a detail section of another embodiment of piston in which a push rod is slidably guided in accordance with the invention.
Figures 5, 6:
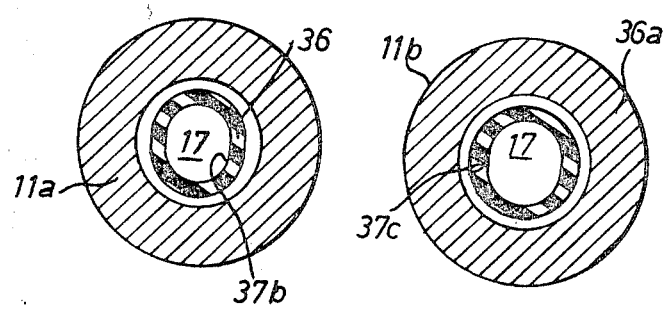
FIG 5 is a cross section on the line B–B of FIG. 4.
FIG 6 is a similar cross section showing an alternative shape of sealing member.

FIGS. 4 and 5 show a modification in which the bush 34 is omitted altogether and the opening 35a slidably guiding the push rod 17 is formed directly in the piston 11a which thereby serves as a guide member for the push rod. The sealing ring 36 is received in a recess 37b of uniform radial depth in the piston 11a and is retained in place by a washer 38 force-fitted in the piston 11a. The opening 35a can be conveniently formed in the piston 11a by broaching.

FIG. 6 shows a slight modification to the piston 11a in that the outer periphery of the recess 37c is circular as is the outer periphery of the sealing ring 36a similarly to the embodiment of FIG. 3.

In all of the illustrated embodiments the push rod 17 is of oblong cross section, i.e., a cross section in the form of two semicircles joined by tangential straight lines. However other noncircular sections are suitable, e.g., oval (i.e., two small radius arcs joined by two larger radius arcs tangential thereto) or elliptical. Alternatively, the push rod 17 could be of square or rectangular section with the corners generously rounded to obtain a satisfactory sliding seal against the resilient sealing ring.

While the invention has been illustrated in relation to an automatic adjuster of the kind described in U.S. Pat. No. 3,491,859 it is equally applicable to the kinds of adjusters described in the above-mentioned U.S. Pats. Nos. 3,442,357 and 3,488,687. It will be noted that some of the adjusters described in the above-mentioned U.S. Pat. No. 3,442,357 are not applied to opposed piston-type hydraulic actuators but to actuators in which a piston is slidable in a reaction cylinder. The present invention is applicable to such an actuator, the cam for mechanically applying the brake being journaled in the cylinder and acting upon a push rod which passes sealingly through the closed end of the cylinder and is sealed thereto. The push rod in this case is also of noncircular section to prevent relative rotation whilst permitting an axial sliding movement and the reaction cylinder serves as a guide member for the push rod.

I claim:

1. In a brake actuating means for a vehicle brake system: a hydraulic actuator including two opposed relatively axially displaceable actuator components defining a space therebetween for brake fluid; and an automatic adjuster including a push rod, a nut having a screw thread connection with said push rod, on of said actuator components being nonrotatable and having therethrough an opening of noncircular cross section, said push rod having a portion of complementary noncircular cross section and axially slidably guided through said opening, a resilient sealing member sealing said push rod to said opening, and means responsive to excess travel between said actuator components for turning said nut in a direction to compensate for such excess travel.

2. The brake actuating means according to claim 1 further comprising a mechanical actuator fitted to said one hydraulic actuator component and acting on the end of said push rod opposite said nut.

3. In a brake actuating means for a vehicle brake system: hydraulic actuating means having a piston; and a mechanism of adjustable length comprising a push rod and a nut having a screw thread connection with said push rod, said nut being disposed for frictional engagement with said piston and said push rod being subjected to the hydraulic pressure applied to the piston but in the opposite direction thereto, said actuating means also including a nonrotatable member having an opening of non circular cross section, said push rod having a portion of complementary non circular cross section and slidably guided in said opening, a resilient sealing member sealing said push rod to said opening, and a further member in axial and rotational engagement with said nut through at least one helically inclined surface, whereby after a predetermined travel of said actuating means has occurred the nut is rotated to increase the length of the mechanism of adjustable length.

4. The brake actuating means according to claim 3, in which said nonrotatable member of said actuator comprises a nonrotatable second piston opposed to the first-mentioned piston.

5. In a brake actuating means for a vehicle brake system: a mechanism of adjustable length comprising a push rod and a nut having a screw thread connection with said push rod, the coefficient of friction between one flank of the screw thread on the push rod and the mating screw thread flank on the nut being comparatively high and the coefficient of friction between the other thread flank on the push rod and its mating flank on the nut being comparatively low, a nonrotatable guide member having an opening of non circular cross section, said push rod having a portion of complementary non circular cross section and slidably guided in said opening, and a resilient sealing member sealing said push rod to said opening.

6. In a brake actuating means for a vehicle brake system: a mechanism of adjustable length comprising push rod and a nut having a screw thread connection with said push rod, a non rotatable guide member having an opening of non circular cross section, said push rod having a portion of complementary non circular cross section and slidably guided in said opening, a resilient sealing member sealing said push rod to said opening, and a friction clutch or brake associated with said nut and provided with means effective responsively to a requirement for adjustment for causing a relative back and forth turning movement between one part of said rotary friction clutch or brake and said push rod when said screw thread connection is under an axial load in one direction, the slip torque of said friction clutch or brake being greater than the lower frictional torque arising at said screw thread connection when turned in a direction with said axial load but less than the higher frictional torque arising at said screw thread connection when turned in a direction against said axial load, whereby said relative back and forth turning movement causes a relative turning movement of the nut on the push rod in one direction only.

7. In a brake actuating means for a vehicle brake system: a mechanism of adjustable length comprising a push rod and a nut having a screw thread connection with said push rod, a non rotatable guide member having an opening of non circular cross section, said push rod having a portion of complementary noncircular cross section and slidably guided in and through said opening a resilient sealing member sealing said push rod to said opening, and a mechanical actuator acting on the end of said push rod opposite said nut.

8. In the brake actuating means according to claim 7: a hydraulic actuator, said non rotatable guide member comprising a piston of said actuator, said mechanical actuator including a cam journaled in said piston.